(12) United States Patent
Monnerat et al.

(10) Patent No.: US 10,394,336 B2
(45) Date of Patent: *Aug. 27, 2019

(54) OCULAR FOCUS SHARING FOR DIGITAL CONTENT

(71) Applicant: Comcast Cable Communications, LLC, Philadelphia, PA (US)

(72) Inventors: Edward David Monnerat, Parker, CO (US); Mehul Patel, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,235

(22) Filed: Mar. 22, 2018

(65) Prior Publication Data

US 2019/0064930 A1 Feb. 28, 2019

Related U.S. Application Data

(63) Continuation of application No. 14/315,150, filed on Jun. 25, 2014, now Pat. No. 9,958,947.

(51) Int. Cl.
*G06F 3/01* (2006.01)
*G06F 3/14* (2006.01)
*G09G 5/00* (2006.01)

(52) U.S. Cl.
CPC .............. *G06F 3/017* (2013.01); *G06F 3/013* (2013.01); *G06F 3/1423* (2013.01); *G09G 5/003* (2013.01); *G09G 2340/12* (2013.01); *G09G 2340/125* (2013.01); *G09G 2340/14* (2013.01); *G09G 2354/00* (2013.01); *G09G 2380/02* (2013.01)

(58) Field of Classification Search
CPC ........ G06F 3/017; G06F 3/1423; G06F 3/013; G09G 5/003; G09G 2380/02; G09G 2354/00; G09G 2340/14; G09G 2340/125; G09G 2340/12
See application file for complete search history.

(56) References Cited

U.S. PATENT DOCUMENTS

| 8,854,282 | B1 | 10/2014 | Wong |
| 2001/0043163 | A1 | 11/2001 | Waldern et al. |
| 2003/0012425 | A1 | 1/2003 | Suzuki et al. |
| 2004/0061041 | A1 | 4/2004 | Ben-Ari et al. |
| 2004/0061831 | A1 | 4/2004 | Aughey et al. |
| 2005/0116929 | A1 | 6/2005 | Molander et al. |
| 2006/0109237 | A1 | 5/2006 | Morita et al. |
| 2006/0256133 | A1 | 11/2006 | Rosenberg |

(Continued)

*Primary Examiner* — Abhishek Sarma
(74) *Attorney, Agent, or Firm* — Banner & Witcoff, Ltd.

(57) ABSTRACT

A position within displayed digital content that a user is ocularly focused on (e.g., where within displayed content the user is looking) may be determined. Digital content comprising a visual indication of the position may be rendered. The visual indication of the position may be displayed on the same display that the user is looking at and/or a different display. In some embodiments, the position may be determined based on data generated by a sensor physically attached to the user. Additionally or alternatively, the position may be determined based on data generated by a stationary computing device comprising a sensor configured to track changes in ocular position of the user. In some embodiments the digital content may comprise digital images and/or video (e.g., broadcast content, on-demand content, images and/or video associated with a computer application, or the like).

27 Claims, 13 Drawing Sheets

(56) References Cited

U.S. PATENT DOCUMENTS

| | | |
|---|---|---|
| 2009/0189830 A1 | 7/2009 | Deering et al. |
| 2009/0189974 A1 | 7/2009 | Deering |
| 2010/0128118 A1 | 5/2010 | Swindells et al. |
| 2010/0156787 A1 | 6/2010 | Katayama |
| 2010/0191727 A1 | 7/2010 | Malik |
| 2010/0231504 A1 | 9/2010 | Bloem et al. |
| 2010/0295774 A1 | 11/2010 | Hennessey |
| 2011/0006978 A1 | 1/2011 | Yuan |
| 2012/0133754 A1 | 5/2012 | Lee et al. |
| 2012/0146891 A1 | 6/2012 | Kalinli |
| 2012/0226150 A1 | 9/2012 | Balicki et al. |
| 2013/0002846 A1 | 1/2013 | De Bruijn et al. |
| 2013/0005443 A1 | 1/2013 | Kosta et al. |
| 2013/0083173 A1 | 4/2013 | Geisner et al. |
| 2013/0154918 A1 | 6/2013 | Vaught et al. |
| 2013/0162632 A1 | 6/2013 | Varga et al. |
| 2013/0169530 A1 | 7/2013 | Bhaskar et al. |
| 2013/0169533 A1 | 7/2013 | Jahnke |
| 2013/0207895 A1 | 8/2013 | Lee et al. |
| 2013/0346168 A1 | 12/2013 | Zhou et al. |
| 2014/0009739 A1 | 1/2014 | Greco et al. |
| 2014/0028542 A1 | 1/2014 | Lovitt et al. |
| 2014/0184550 A1 | 7/2014 | Hennessey et al. |
| 2014/0313408 A1 | 10/2014 | Sharma et al. |
| 2015/0049001 A1 | 2/2015 | Rahman et al. |

OCULAR FOCUS SHARING FOR DIGITAL CONTENT

RELATED APPLICATIONS

The present application claims priority to, and is a continuation of, U.S. patent application Ser. No. 14/315,150, filed Jun. 25, 2014, entitled "Ocular Focus Sharing for Digital Content", which is hereby incorporated by reference in its entirety for all purposes.

BACKGROUND

Digital content is increasingly pervading every aspect of modern life. New devices such as smart phones, smart watches, tablet computers, and the like, allow users to consume, generate, and share digital content virtually anytime, anywhere. Moreover, human-computer interaction technologies, such as motion-sensing/tracking input devices, optical head-mounted displays and other wearable technologies, allow users to intuitively consume and interact with digital content. The creation and consumption of digital content, however, is often a collaborative endeavor, and may benefit from a shared experience. Accordingly, a need exists for ocular focus sharing for digital content.

SUMMARY

This disclosure relates to ocular focus sharing for digital content. Embodiments are provided that determine a position within displayed digital content that a user is ocularly focused on (e.g., where within displayed content the user is looking). Digital content comprising a visual indication of the position may be rendered. The visual indication of the position may be displayed on the same display that the user is looking at and/or a different display. In some embodiments, the position may be determined based on data generated by a sensor physically attached to the user. Additionally or alternatively, the position may be determined based on data generated by a stationary computing device comprising a sensor configured to track changes in ocular position of the user. In some embodiments the digital content may comprise digital images and/or video (e.g., broadcast content, on-demand content, images and/or video associated with a computer application, or the like). In some embodiments, the digital images and/or video may be contemporaneously generated by a camera of the user. In some embodiments, the position the user is ocularly focused on may be determined in response to the user invoking an ocular-focus-sharing feature (e.g., via an ocular gesture).

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
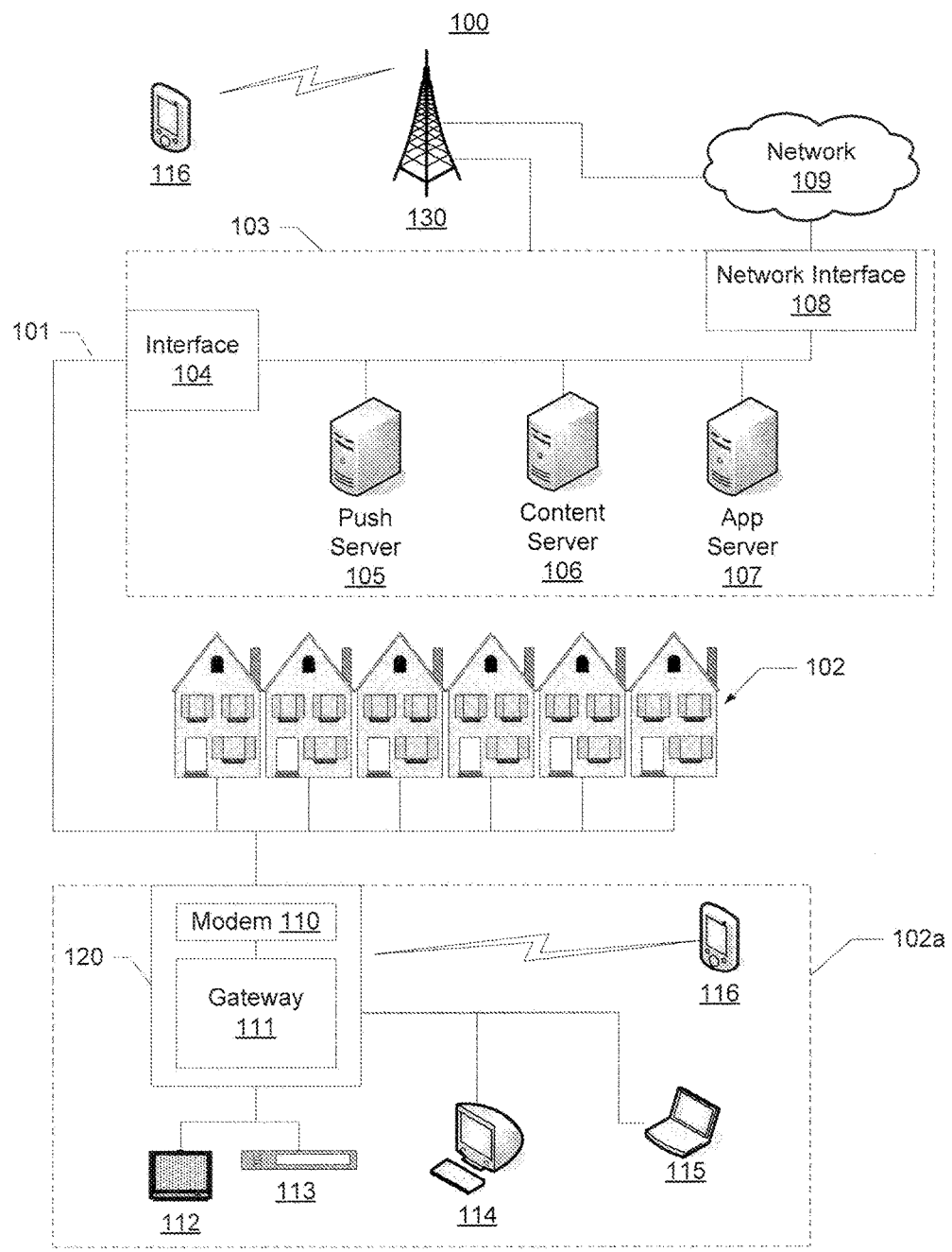
FIG. 1 depicts an illustrative network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102*a*). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
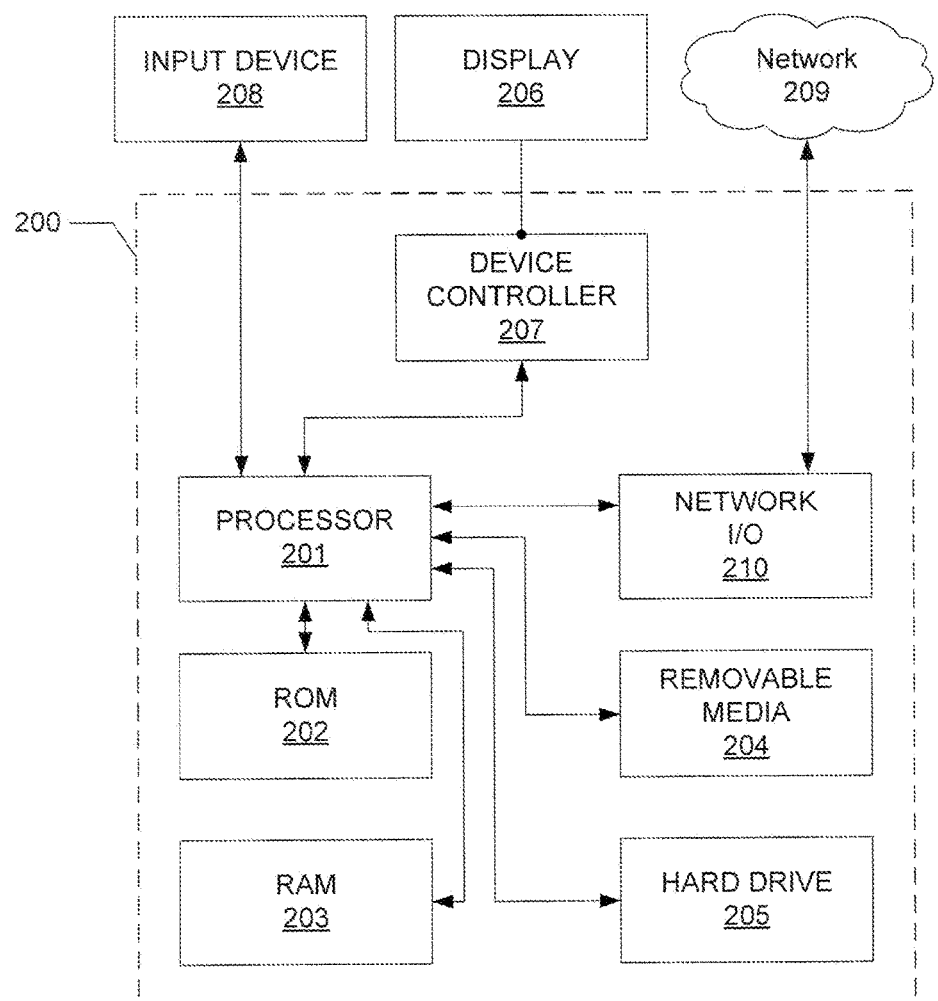
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
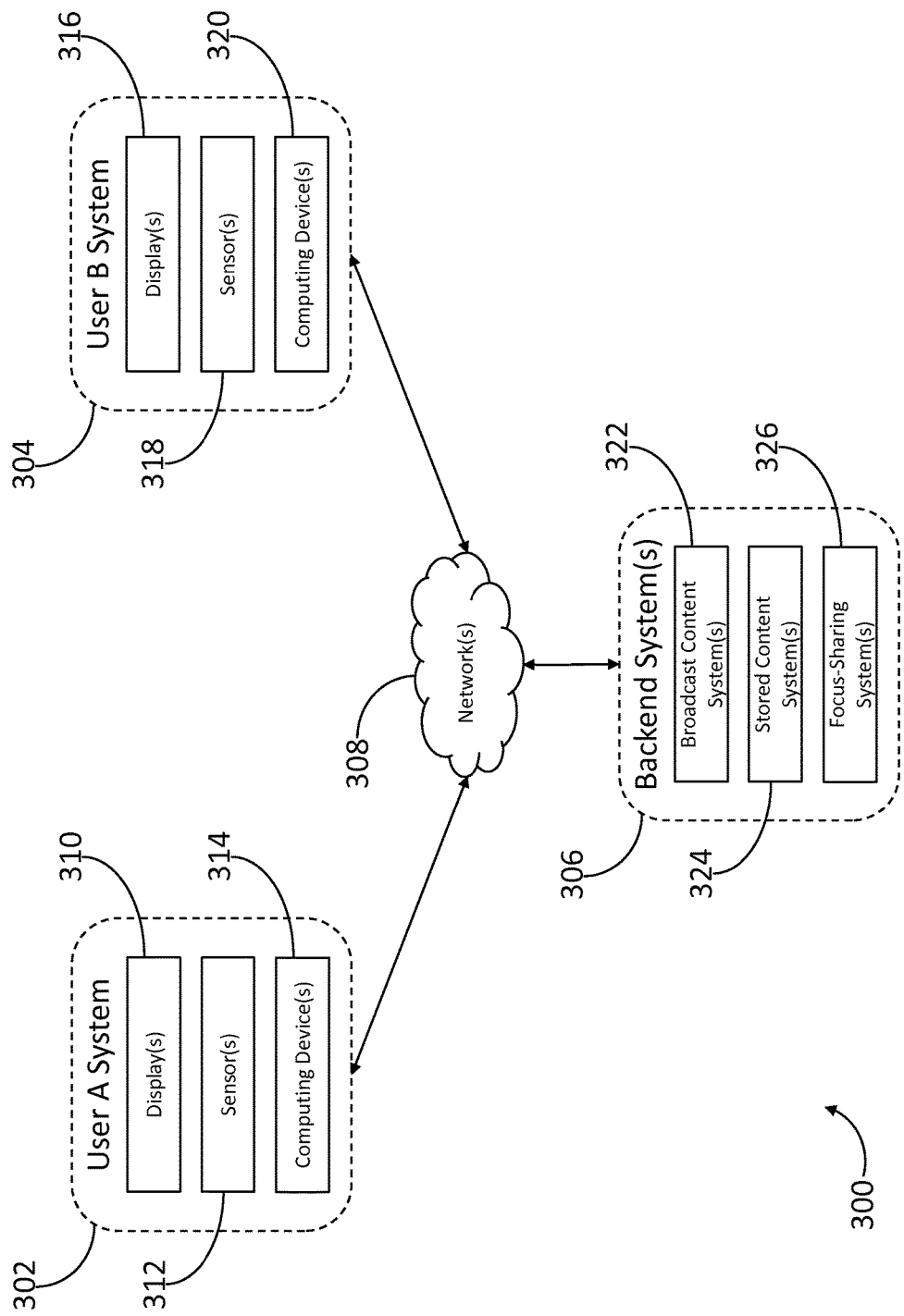
FIG. 3 depicts an illustrative environment for employing systems and methods in accordance with one or more aspects of the disclosure.

FIG. 3 depicts an illustrative environment for employing systems and methods in accordance with one or more aspects of the disclosure. Referring to FIG. 3, an environment 300 may include one or more computing systems and/or devices. For example, the environment 300 may include a user computing system 302, a user computing system 304, and one or more backend computing systems 306. The environment 300 may include one or more networks 308 (e.g., Local Area Networks (LANs), Wide Area Networks (WANs), backbone networks, distribution networks, or the like), which may interconnect one or more devices of the user computing system 302, the user computing system 304, and/or the backend computing systems 306. The user computing system 302 may include one or more displays 310, sensors 312, and/or computing devices 314. Similarly, the user computing system 304 may include one or more displays 316, sensors 318, and/or computing devices 320. The displays 310 and/or the displays 316 may include one or more devices configured to visually display digital content for viewing by one or more users, for example, monitors, screens, projectors, televisions, virtual reality headsets, optical head-mounted displays (e.g., GOOGLE GLASS), or the like.

The sensors 312 and/or the sensors 318 may include one or more devices configured to generate data representative of physical conditions and/or relative locations, for example, digital cameras, terrestrial-network geographic location sensors (e.g., for determining geographic position based on a location within a wireless or cellular network), satellite geographic location sensors (e.g., Global Positioning System (GPS) receivers), or the like. As will be described in greater detail below, the sensors 312 and/or the sensors 318 may include one or more devices configured to generate data from which a position within displayed digital content a user is ocularly focused on may be determined. For example, the sensors 312 and/or the sensors 318 may include a wearable device (e.g., a camera and/or optical head-mounted display) that is physically attached to a user, which, when the user is watching or viewing displayed digital content, may generate data from which a position within the displayed digital content the user is ocularly focused on may be determined. Additionally or alternatively, the sensors 312 and/or the sensors 318 may include one or more stationary computing devices configured to track changes in ocular position of the user, for example, one or more motion sensing input devices (e.g., MICROSOFT KINECT), or the like. Data generated by such stationary computing device(s) may be utilized to determine a position within the displayed digital content that the user is ocularly focused on.

The computing devices 314 and the computing devices 320 may include one or more computing devices associated with the user computing system 302 and the user computing system 304, respectively. For example, the computing devices 314 and/or the computing devices 320 may include one or more desktop computers, laptop computers, tablet computers, mobile devices, smart phones, smart watches, set-top boxes, or the like. In some embodiments, one or more devices within the user computing system 302 and/or the user computing system 304 may communicate with one or more other devices within the user computing system 302 or the user computing system 304, respectively, for example, via a local communication interface and/or technology (e.g., a local network, Wi-Fi network, BLUETOOTH technology, or the like). For example, the displays 310 may include an optical head-mounted display configured to communicate with a computing device of the computing devices 314 (e.g., via BLUETOOTH technology, or the like).

The backend computing systems 306 may include one or more systems for generating, storing, communicating, broadcasting, and/or sending digital content to devices in the environment 300. For example, the backend computing systems 306 may include one or more broadcast content systems 322 configured to broadcast digital content to a plurality of user computing systems (e.g., the user computing system 302 and/or the user computing system 304). Additionally or alternatively, the backend computing systems 306 may include one or more stored content systems 324 (e.g., on-demand content systems) configured to store digital content, and, responsive to a request from a particular user computing system (e.g., the user computing system 302), communicate or send the requested digital content to the particular user computing system (e.g., the user computing system 302). In some embodiments, the backend computing systems 306 may include one or more focus-sharing systems 326. As will be described in greater detail below, the focus-sharing systems 326 may include one or more computing devices configured to receive data indicating a position that a user is ocularly focused on within displayed digital content from a user computing system (e.g., the user computing system 302), render digital content comprising a visual indication of the position, and/or communicate or send the digital content comprising the visual indication of the position to the user computing system (e.g., the user computing system 302) and/or a different user computing system (e.g., the user computing system 304).

Figure 4:
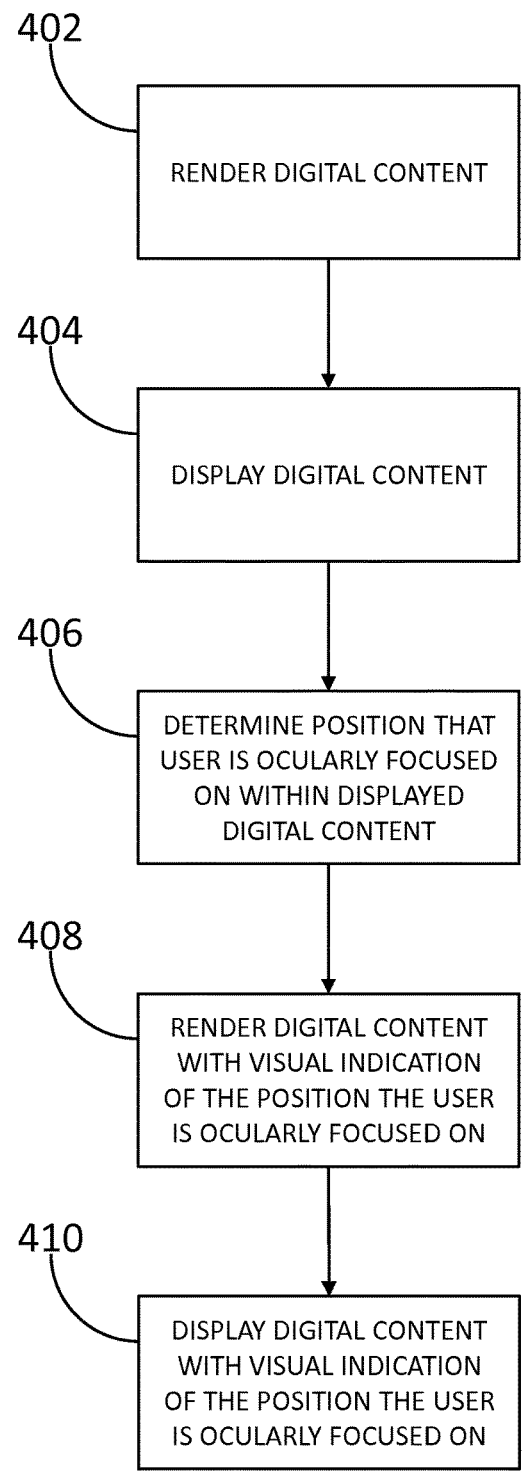
FIG. 4 depicts an illustrative method in accordance with one or more aspects of the disclosure.

FIG. 4 depicts an illustrative method in accordance with one or more aspects of the disclosure. Referring to FIG. 4, at a step 402, digital content may be rendered. For example, a user of the user computing system 302 may utilize a camera of the sensors 312 to generate data representative of a real world scene contemporaneously observed by the user, and one or more of the computing devices 314 may utilize the data to render digital content (e.g., images, video, or the like). Additionally or alternatively, one or more of the backend computing systems 306 (e.g., the broadcast content systems 322 and/or the stored content systems 324 may render digital content (e.g., images, video, or the like).

Figure 5:
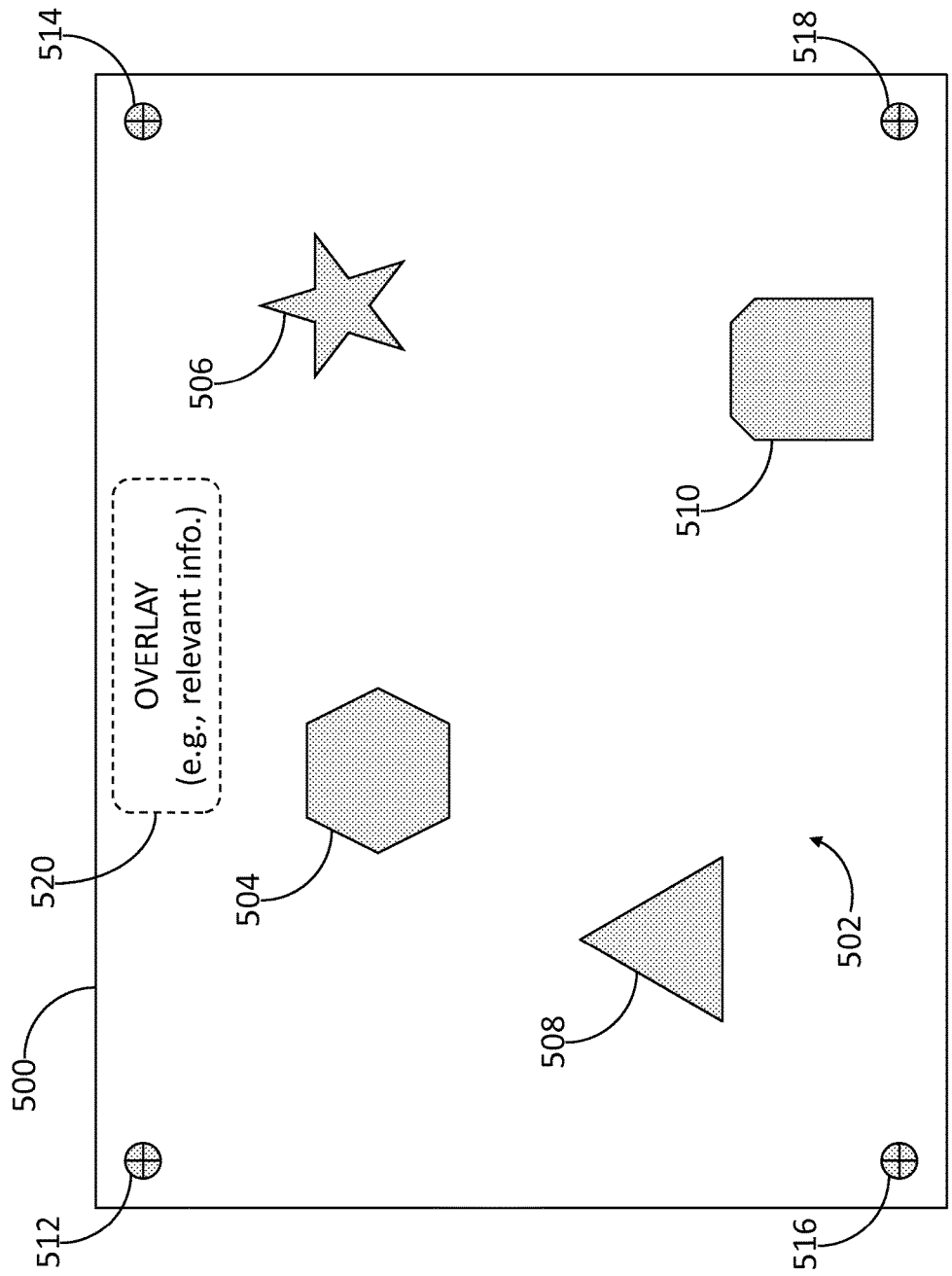
FIG. 5 depicts illustrative digital content in accordance with one or more aspects of the disclosure.

FIG. 5 depicts illustrative digital content in accordance with one or more aspects of the disclosure. Referring to FIG. 5, the digital content 500 may include a scene 502, which may comprise one or more elements (e.g., portions, objects, people, areas of interest, or the like). For example, the scene 502 may include an element 504, an element 506, an element 508, and an element 510. As will be described in greater detail below, the digital content 500 may be rendered to include and/or be overlaid with one or more positional indicators. For example, the digital content 500 may be rendered to include and/or be overlaid with: a positional indicator 512, corresponding to the top left corner; a positional indicator 514, corresponding to the top right corner; a positional indicator 516, corresponding to the bottom left corner; and/or a positional indicator 518, corresponding to the bottom right corner. In some embodiments, the positional indicator 512, the positional indicator 514, the positional indicator 516, and/or the positional indicator 518 may be a predetermined shape, size, color, or the like. In some embodiments, the positional indicator 512, the positional indicator 514, the positional indicator 516, and/or the positional indicator 518 may be visible to the human eye. In some embodiments, the positional indicator 512, the positional indicator 514, the positional indicator 516, and/or the positional indicator 518 may not be visible to the human eye. In some embodiments, the digital content 500 may include one or more elements of overlay information 520, for example, information relevant to the scene 502, the element 504, the element 506, the element 508, and/or the element 510 (e.g., information that might be displayed via a head-up display in an optical head-mounted display).

Returning to FIG. 4, at a step 404, the rendered digital content may be displayed on a display. For example, the digital content 500 may be displayed on one or more of the displays 310 (e.g., projected onto a screen by a projector, displayed by a monitor or television display, displayed within a virtual reality headset, displayed by an optical head-mounted display, or the like). At a step 406, a position that a user is ocularly focused on within the displayed digital content may be determined. For example, the digital content 500 may be displayed on a display of the displays 310 (e.g., projected on a screen, displayed by an optical head-mounted display) and a user viewing the digital content 500 may be ocularly focused on the element 506. For example, if the digital content 500 is projected onto a screen or displayed by a display visible to a plurality of users, a user (e.g., a predetermined user, such as a presenter at the front of the room) may be ocularly focused on the element 506 (e.g., looking at the element 506 within the digital content 500, as opposed to the element 504, the element 508, or the element 510). Additionally or alternatively, if the digital content 500 is displayed by an optical head-mounted display, a user wearing the optical head-mounted display may be focused on the element 506.

In some embodiments, the position the user is ocularly focused on within the displayed digital content may be determined based on data generated by a sensor physically attached to the user. For example, the user may be wearing a camera (e.g., as part of a virtual reality headset, optical head-mounted display, or the like) that may capture one or more images comprising the digital content 500 over a period of time. The image(s) captured by the camera may include one or more of the positional indicator 512, the positional indicator 514, the positional indicator 516, and/or the positional indicator 518, and the position the user is ocularly focused on within the digital content 500 (e.g., a position corresponding to the element 506) may be determined based on the changes of the positional indicator 512, the positional indicator 514, the positional indicator 516, and/or the positional indication 518 within the image(s) over the period of time. Additionally or alternatively, the position the user is ocularly focused on within the displayed digital content may be determined based on data generated by a stationary computing device configured to track changes in ocular position of the user. As indicated above, the sensors 312 may include one or more stationary computing devices configured to track changes in position of the user over a period of time (e.g., motion sensing input devices, or the like), for example, changes in the user's head position and/or changes in ocular position of the user (e.g., the pupil(s) of the user's eye(s), the white(s) of the user's eye(s), or the like). The stationary computing device(s) may generate data representative of the changes in position of the user, and the position the user is ocularly focused on within the digital content 500 (e.g., a position corresponding to the element 506) may be determined based this data.

In some embodiments, determining the position the user is ocularly focused on within the displayed digital content may include determining a physical distance between the user and the display displaying the digital content. For example, if the digital content 500 is displayed on a screen by a projector, and the distance between the user and the screen is fluctuating (e.g., as the user moves around the room) the physical distance between the user and the screen may be determined. For example, the stationary computing device(s) may determine the distance based on a change in the size of the user's motion or figure over a period of time (e.g., as the user moves away from the screen and/or the stationary computing device(s), the user's motion or figure may be reduced). Additionally or alternatively, the image(s) generated by the camera physically attached to the user may show a change in the size of the digital content 500 (e.g., the distance between one or more of the positional indicator 512, the positional indicator 514, the positional indicator 516, and/or the positional indicator 518). In such embodiments, determining the position within the digital content 500 that the user is ocularly focused on (e.g., the position corresponding to the element 506) may include factoring in the physical distance between the user and the display displaying the digital content 500 (e.g., the screen).

Figure 6:
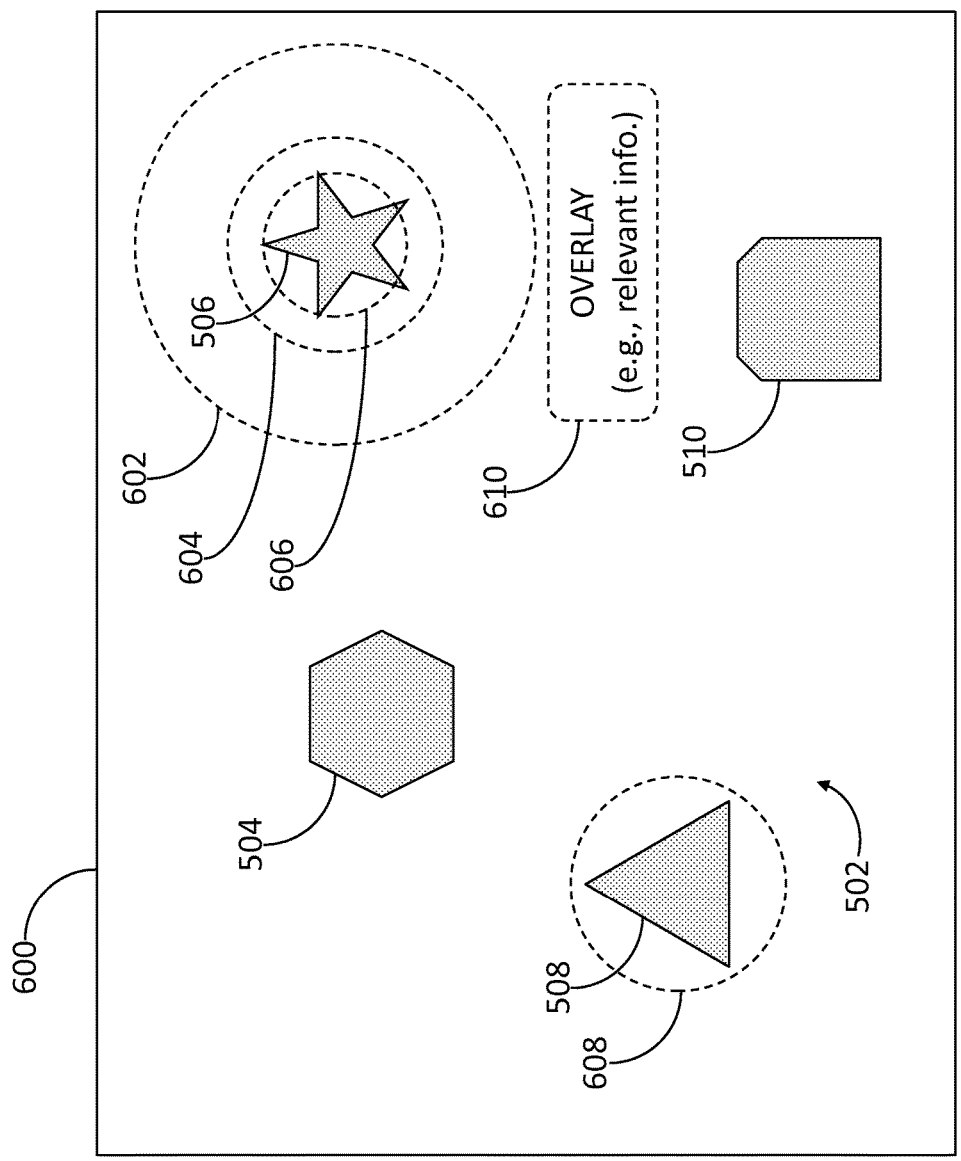
FIG. 6 depicts illustrative digital content comprising a visual indication of a position that a user is ocularly focused on in accordance with one or more aspects of the disclosure.

At a step 408, digital content comprising a visual indication of the position the user is ocularly focused on within the displayed digital content may be rendered. FIG. 6 depicts illustrative digital content comprising a visual indication of a position that a user is ocularly focused on in accordance with one or more aspects of the disclosure. Referring to FIG. 6, the digital content 600 may include the scene 502 (or a portion thereof) from the digital content 500. For example, the digital content 600 may include the element 504, the element 506, the element 508, and/or the element 510. The digital content may also include one or more visual indications 602, 604, 606, and/or 608 of the position within the digital content that the user is ocularly focused on. In some embodiments, a confidence interval of the position the user is ocularly focused on within the displayed digital content may be determined. The confidence interval may represent a degree of confidence that the visual indication corresponds to the area within the displayed digital content that the user is ocularly focused on. In such embodiments, the visual indication may be altered based on the confidence interval, for example, if the confidence interval is low (e.g., it is not possible to determine to a high degree of certainty where within the displayed digital content the user is focused), the visual indication 602 may be rendered (e.g., indicating the area within the digital content 500 that it is possible to determine that the user is focused). Similarly, if the confidence interval is high (e.g., it is possible to determine to a high degree of certainty where within the displayed digital content the user is focused), the visual indication 606 may be rendered (e.g., indicating a relatively smaller area within the digital content 500 that it is possible to determine that the user is focused). If the confidence interval is of an intermediate level (e.g., a level in between the level indicated by the visual indication 602 and the level indicated by visual indication 606), the visual indication 604 may be rendered. It will be appreciated that in such embodiments, the visual indication may be dynamically resized as the confidence interval varies. As will be described in greater detail below, in some embodiments, the digital content 600 may also include one or more elements of overlay information 610, for example, information relevant to the position the user is ocularly focused on (e.g., external content or supplemental information relevant to the element 506) and/or the visual indication of the position (e.g., the confidence interval of the position).

Returning to FIG. 4, at a step 410, the digital content comprising the visual indication of the position the user is ocularly focused on may be displayed. In some embodiments, the digital content comprising the visual indication of the position the user is ocularly focused on may be displayed on the same display the digital content was originally displayed on (e.g., the display the user focused on the position within the content on). For example, if the digital content 500 was displayed on a screen by a projector in the step 404, the digital content 600 may be displayed on the screen by the projector (e.g., the visual indications 602, 604, and/or 606 may appear and/or serve as a virtual laser pointer). Additionally or alternatively, as will be described in greater detail below, the digital content comprising the visual indication of the position the user is ocularly focused on (e.g., the digital content 600) may be displayed on a different display. For example, the digital content 600 may be communicated or sent (e.g., via networks 308) to the user computing system 304 for display on one or more of the displays 316. In some embodiments, the digital content comprising the visual indication of the position the user is ocularly focused on may be displayed on a different display that is physically collocated with the display the user focused on the position within the content on. For example, the displays 310 may include an optical head-mounted display, a user of the user computing system 302 may be wearing the optical head-mounted display, the optical head-mounted display may display the digital content 500, the user may ocularly focus on the element 506, the digital content 600 may be rendered, and the digital content 600 may be displayed on a different display of the displays 310 (e.g., a screen by a projector, a television or monitor, or the like). In some embodiments, the optical head-mounted display may be configured to display content on an external side (e.g., a non-wearer facing side) of the optics, and the digital content 600 may be displayed on the external side of the optics.

Figure 7A:
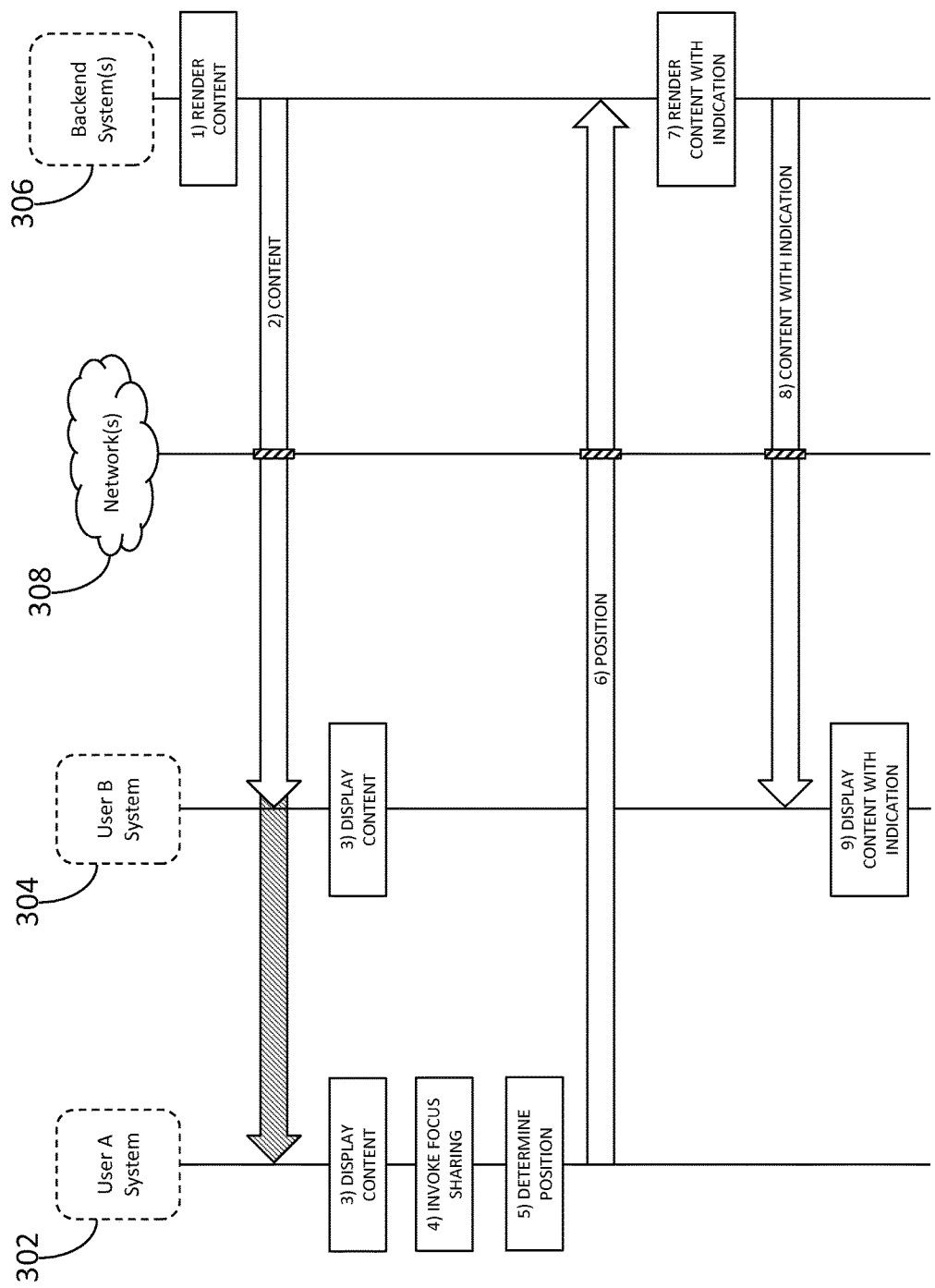
FIGS. 7A and 7B depict an illustrative event sequence in accordance with one or more aspects of the disclosure.
Figure 7B:
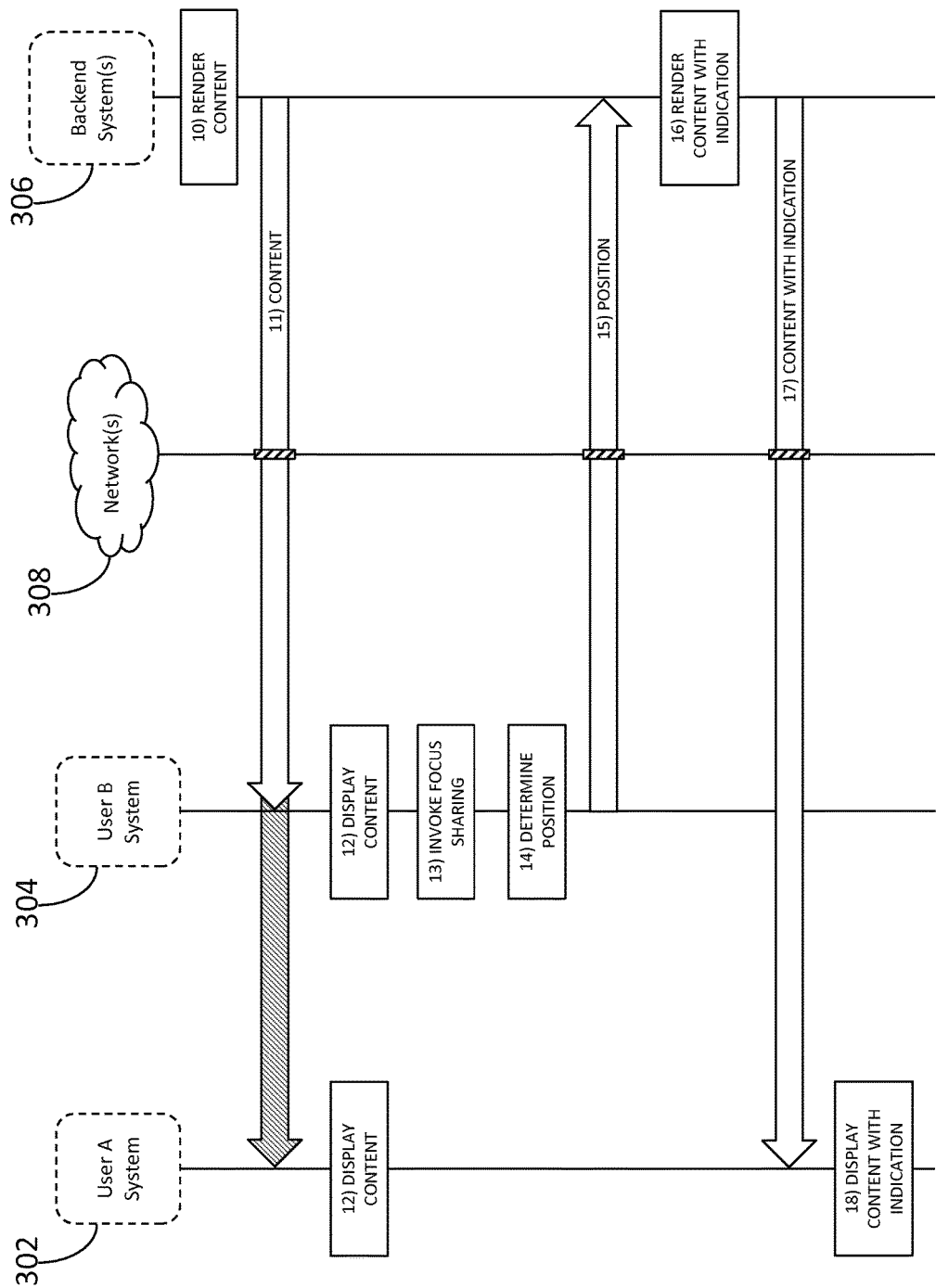

FIGS. 7A and 7B depict an illustrative event sequence in accordance with one or more aspects of the disclosure. The events and steps illustrated in FIGS. 7A and 7B are merely illustrative, and one of ordinary skill in the art will recognize that some steps or events may be omitted, that some steps or events may be performed or occur in an order other than that illustrated, and/or that some steps or events may be performed by or occur at a device other than that illustrated. Referring to FIG. 7A, at a step 1, one or more of the backend computing systems 306 may render digital content. For example, one or more of the broadcast content systems 322 may render the digital content 500 (e.g., video of a sporting event). At a step 2, the one or more of the backend computing systems 306 may send, communicate, or broadcast the digital content 500 (e.g., the video of the sporting event) to the user computing system 302 and the user computing system 304 via the networks 308. At a step 3, the user computing system 302 and the user computing system 304 may display the digital content 500 (e.g., on one or more of the displays 310 and/or the displays 316, respectively). At a step 4, a user of the user computing system 302 (e.g., a user of the user computing system 302 watching the video of the sporting event on one or more of the displays 310) may invoke an ocular-focusing-sharing feature (e.g., supported by one or more of the computing devices 314). In some embodiments, the user of the user computing system 302 may invoke the ocular-focusing-sharing feature via an ocular gesture (e.g., a predetermined blink sequence, a prolonged gaze, a focus on a predetermined position of the displayed digital content, or the like). In such embodiments, the ocular gesture may be detected (e.g., by one or more of the sensors 312), and the ocular-focus-sharing feature may be invoked responsive to detection of the ocular gesture.

At a step 5, the user computing system 302 (e.g., one or more of the computing devices 314) may determine a position within the digital content 500 that the user of the user computing system 302 is ocularly focused on, for example, a position corresponding to the element 506 (e.g., a particular player in the sporting event). At a step 6, the user computing system 302 may communicate or send the position corresponding to the element 506 (e.g., data indicating the position corresponding to the element 506) to the backend computing systems 306 (e.g., via the networks 308). One or more computing devices of the backend computing systems 306 (e.g., one of the focus-sharing systems 326) may receive the position corresponding to the element 506, and, at a step 7, may render the digital content 600 comprising the visual indication 604 (e.g., a replay of the portion of the sporting event in which the user of the user computing system 302 invoked the ocular-focus-sharing feature and focused on the position corresponding to the element 506). At a step 8, the backend computing systems 306 (e.g., one of the focus-sharing systems 326) may communicate or send the digital content 600 comprising the visual indication 604 to the user computing system 304 (e.g. via the networks 308). At a step 9, the user computing system 304 may display the digital content 600 (e.g., the replay of the portion of the sporting event) on one or more of the displays 316, for example, providing one or more users of the user computing system 304 with a view of what the user of the user computing system 302 was previously focused on within the digital content 500 (e.g., the player or the element 506, as indicated by the visual indication 604).

Referring to FIG. 7B, at a step 10, one or more of the backend computing systems 306 may render digital content. For example, one or more of the broadcast content systems 322 may render the digital content 500 (e.g., additional video of the sporting event). At a step 11, the one or more of the backend computing systems 306 may send, communicate, or broadcast the digital content 500 (e.g., the additional video of the sporting event) to the user computing system 302 and the user computing system 304 via the networks 308. At a step 12, the user computing system 302 and the user computing system 304 may display the digital content 500 (e.g., on one or more of the displays 310 and/or the displays 316, respectively). At a step 13, a user of the user computing system 304 (e.g., a user of the user computing system 304 watching the additional video of the sporting event on one or more of the displays 316) may invoke an ocular-focusing-sharing feature (e.g., supported by one or more of the computing devices 320). At a step 14, the user computing system 304 (e.g., one or more of the computing devices 320) may determine a position within the digital content 500 that the user of the user computing system 304 is ocularly focused on, for example, a position corresponding to the element 508 (e.g., a particular player in the sporting event). At a step 15, the user computing system 304 may communicate or send the position corresponding to the element 508 (e.g., data indicating the position corresponding to the element 508) to the backend computing systems 306 (e.g., via the networks 308). One or more computing devices of the backend computing systems 306 (e.g., one of the focus-sharing systems 326) may receive the position corresponding to the element 508, and, at a step 16, may render the digital content 600 comprising the visual indication 608 (e.g., a replay of the portion of the sporting event in which the user of the user computing system 304 invoked the ocular-focus-sharing feature and focused on the position corresponding to element 508). At a step 17, the backend computing systems 306 (e.g., one of the focus-sharing systems 326) may communicate or send the digital content 600 comprising the visual indication 608 to the user computing system 302 (e.g., via the networks 308). At a step 18, the user computing system 302 may display the digital content 600 (e.g., the replay of the portion of the sporting event) on one or more of the displays 310, for example, providing one or more users of the user computing system 302 with a view of what the user of the user computing system 304 was previously focused on within the digital content 500 (e.g., the player or the element 508, as indicated by the visual indication 608).

Figure 8A:
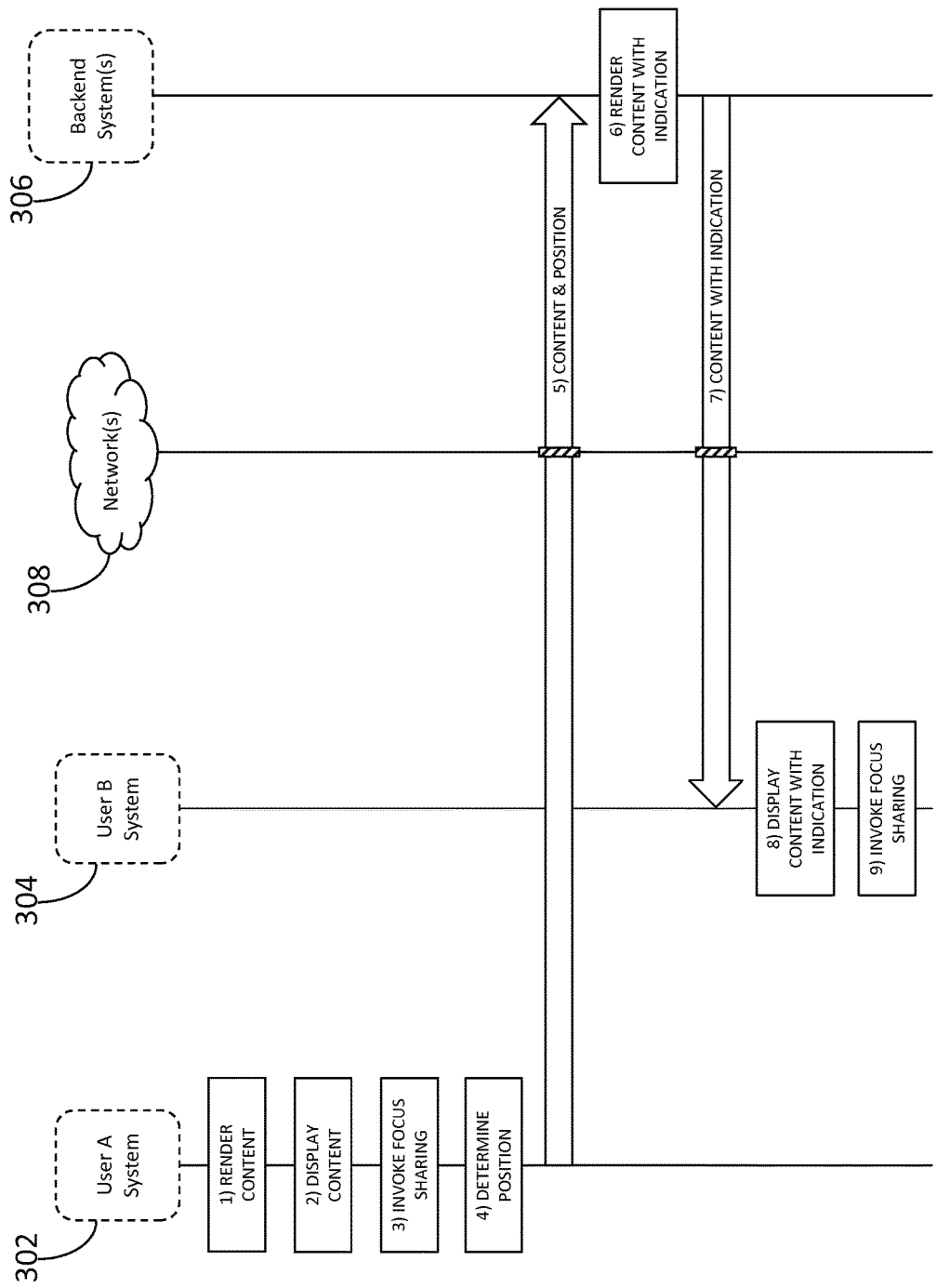
FIGS. 8A and 8B depict an additional illustrative event sequence in accordance with one or more aspects of the disclosure.
Figure 8B:
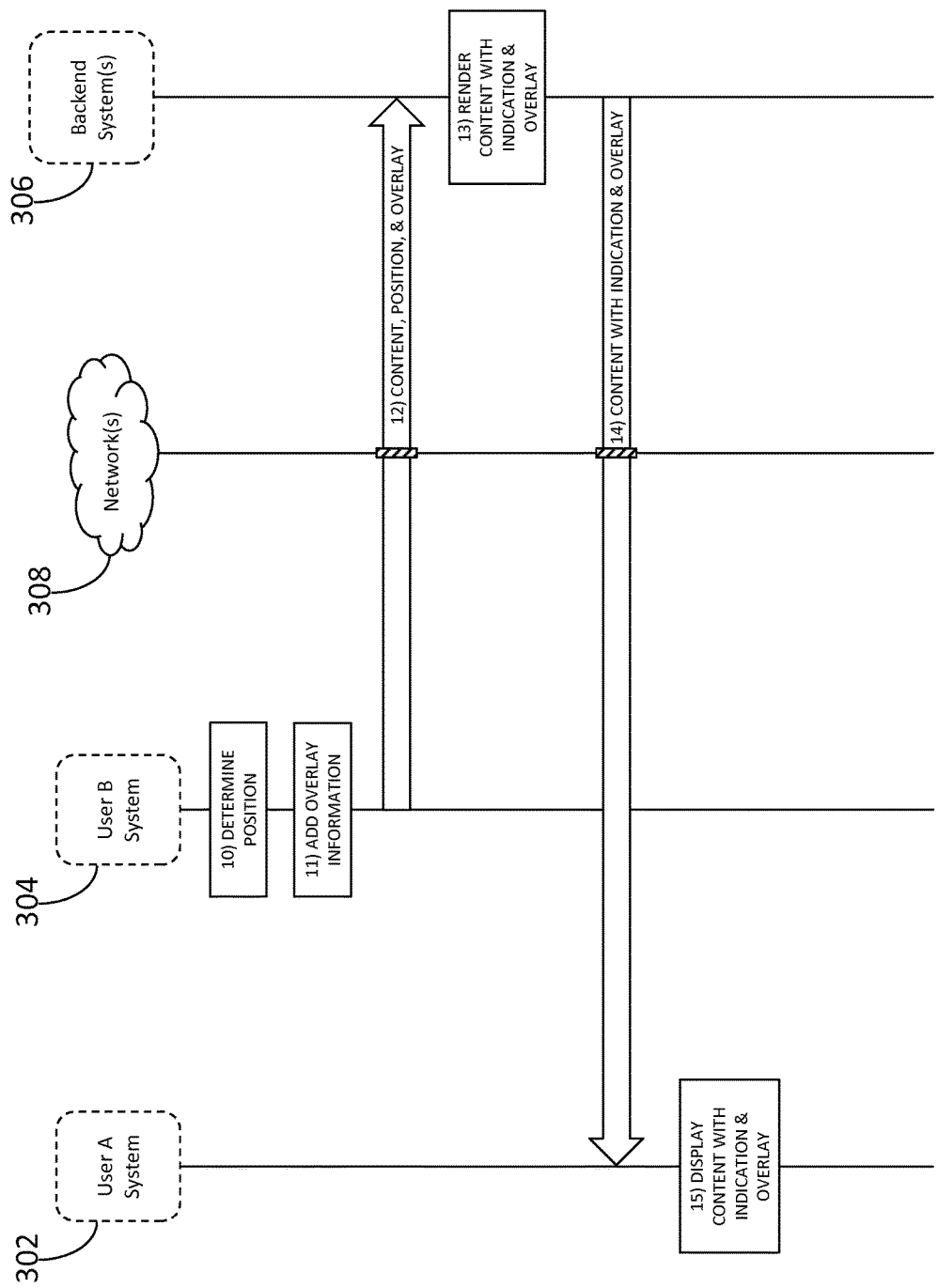

FIGS. 8A and 8B depict an additional illustrative event sequence in accordance with one or more aspects of the disclosure. The events and steps illustrated in FIGS. 8A and 8B are merely illustrative, and one of ordinary skill in the art will recognize that some steps or events may be omitted, that some steps or events may be performed or occur in an order other than that illustrated, and/or that some steps or events may be performed by or occur at a device other than that illustrated. Referring to FIG. 8A, at a step 1, the user computing system 302 may render digital content. For example, the sensors 312 may include a camera, which may generate data representative of a physical scene contemporaneously observed by a user of the user computing system 302. For example, the user of the user computing system 302 may be a bomb squad technician, and may utilize the camera to generate data representative of a bomb the technician is contemporaneously observing. One or more of the computing devices 314 may utilize the data generated by the camera to render digital content 500 (e.g., an image of the bomb). As indicated above, in some embodiments, the digital content 500 may include the overlay information 520 (e.g., information relevant to the bomb, environmental variables associated with the physical scene, or the like). At a step 2, the user computing system 302 may display the digital content 500 (e.g., the image of the bomb), for example, on one or more of the displays 310.

At a step 3, the user of the user computing system 302 (e.g., the technician viewing the displayed image of the bomb on one or more of the displays 310) may invoke an ocular-focusing-sharing feature (e.g., supported by one or more of the computing devices 314). At a step 4, the user computing system 302 (e.g., one or more of the computing devices 314) may determine a position within the digital content 500 (e.g., the image of the bomb) that the user of the user computing system 302 is ocularly focused on, for example, a position corresponding to the element 508 (e.g., a component of the bomb that concerns the technician). At a step 5, the user computing system 302 may communicate or send the digital content 500 and the position corresponding to the element 508 (e.g., data indicating the position corresponding to the element 508) to the backend computing systems 306 (e.g., via the networks 308). One or more computing devices of the backend computing systems 306 (e.g., one of the focus-sharing systems 326) may receive the digital content 500 and the position corresponding to the element 508. At a step 6, the backend computing systems 306 (e.g., one of the focus sharing systems 326) may render the digital content 600 comprising at least a portion of the digital content 500 (e.g., a portion of the scene 502 including the element 506 and the element 508) and the visual indication 608 (e.g., an image of the bomb with the component of the bomb that concerns the technician visually indicated). As indicated above, in some embodiments, the digital content 500 may include the overlay information 520 (e.g., information relevant to the bomb, environmental variables associated with the physical scene, or the like). In such embodiments, the digital content 600 may be rendered to include the overlay information 520. At a step 7, the backend computing systems 306 (e.g., one of the focus-sharing systems 326) may communicate or send the digital content 600 comprising the visual indication 608 (and, in some embodiments, the overlay information 520) to the user computing system 304 (e.g., via the networks 308).

At a step 8, the user computing system 304 may display the digital content 600 (e.g., the image of the bomb with the component of the bomb that concerns the technician (the element 508) visually indicated) on one or more of the displays 316, for example, providing one or more users of the user computing system 304 (e.g., a remotely located bomb expert) with a view of what the user of the user computing system 302 was previously focused on within the digital content 500 (e.g., the bomb component of concern to the technician or the element 508, as indicated by the visual indication 608). At a step 9, the user of the user computing system 304 (e.g., the remotely located bomb expert) may invoke an ocular-focusing-sharing feature (e.g., supported by one or more of the computing devices 320). Referring to FIG. 8B, at a step 10, the user computing system 304 (e.g., one or more of the computing devices 320) may determine a position within the digital content 600 (e.g., the image of the bomb) that the user of the user computing system 304 is ocularly focused on, for example, a position corresponding to the element 506 (e.g., a different component of the bomb that concerns the remotely located expert). At a step 11, the user of the user computing system 304 may add the overlay information 610 (e.g., information relevant to the different component of the bomb that concerns the remotely located expert) to the digital content 600. At a step 12, the user computing system 304 may communicate or send the digital content 600, the position corresponding to the element 506 (e.g., data indicating the position corresponding to the element 506), and the overlay information 610 to the backend computing systems 306 (e.g., via the networks 308). One or more computing devices of the backend computing systems 306 (e.g., one of the focus-sharing systems 326) may receive the digital content 600, the position corresponding to the element 506, and the overlay information 610. At a step 13, the backend computing systems 306 (e.g., one of the focus sharing systems 326) may render (or re-render) the digital content 600 comprising at least a portion of the digital content 500 (e.g., a portion of the scene 502 including the element 506 and the element 508), the visual indication 604, and the overlay information 610 (e.g., an image of the bomb with the different component of the bomb that concerns the remotely located expert visually indicated, and relevant information overlaid). At a step 14, the backend computing systems 306 (e.g., one of the focus-sharing systems 326) may communicate or send the digital content 600 comprising the at least a portion of the digital content 500, the visual indication 604, and the overlay information 610 to the user computing system 302 (e.g., via the networks 308). At a step 15, the user computing system 302 may display the digital content 600 (e.g., the image of the bomb with the different component of the bomb that concerns the remotely located expert visually indicated, and relevant information overlaid), for example, on one or more of the displays 310 (e.g., for viewing by the technician).

Figure 9A:
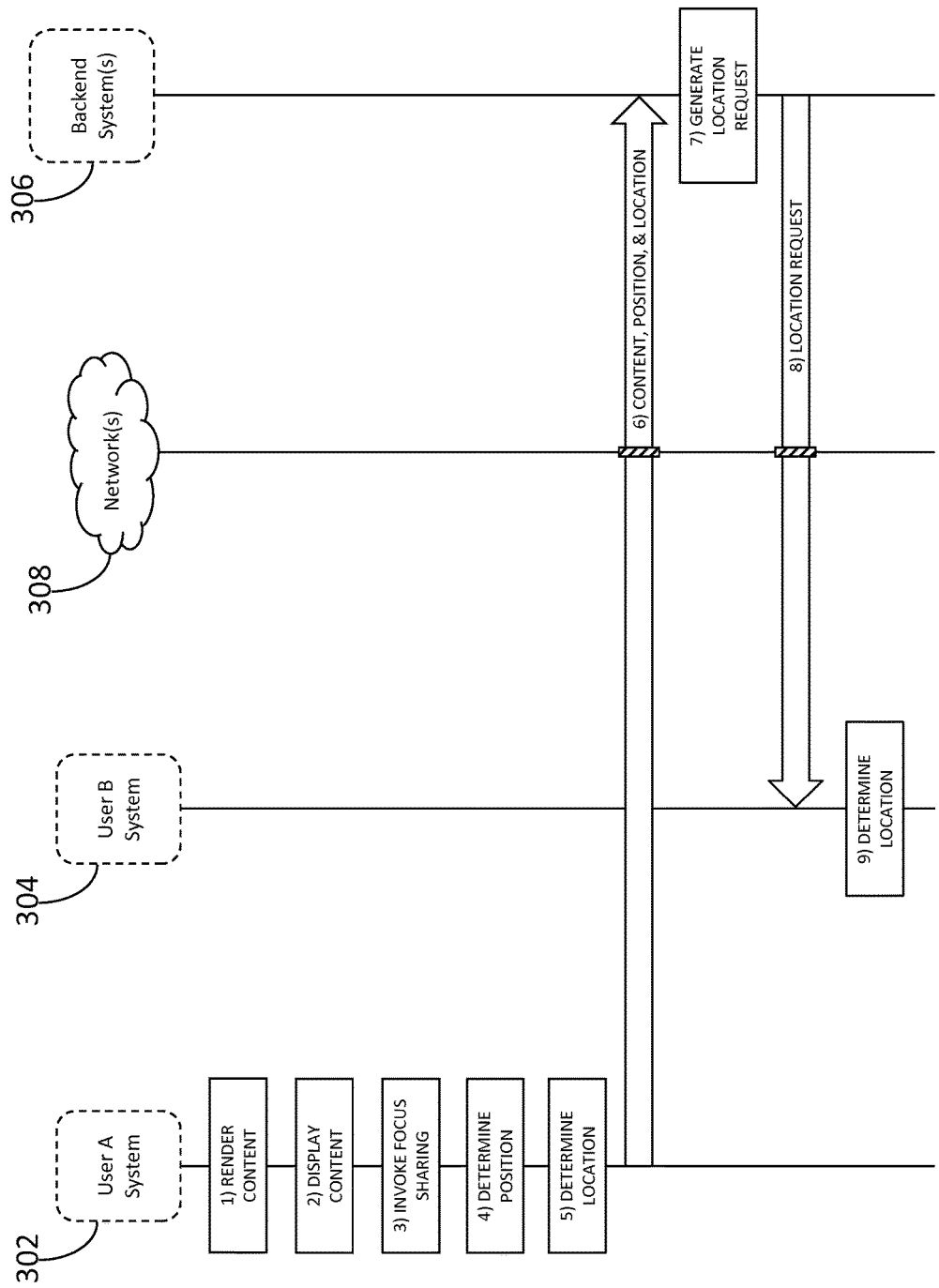
FIGS. 9A and 9B depict a further illustrative event sequence in accordance with one or more aspects of the disclosure.
Figure 9B:
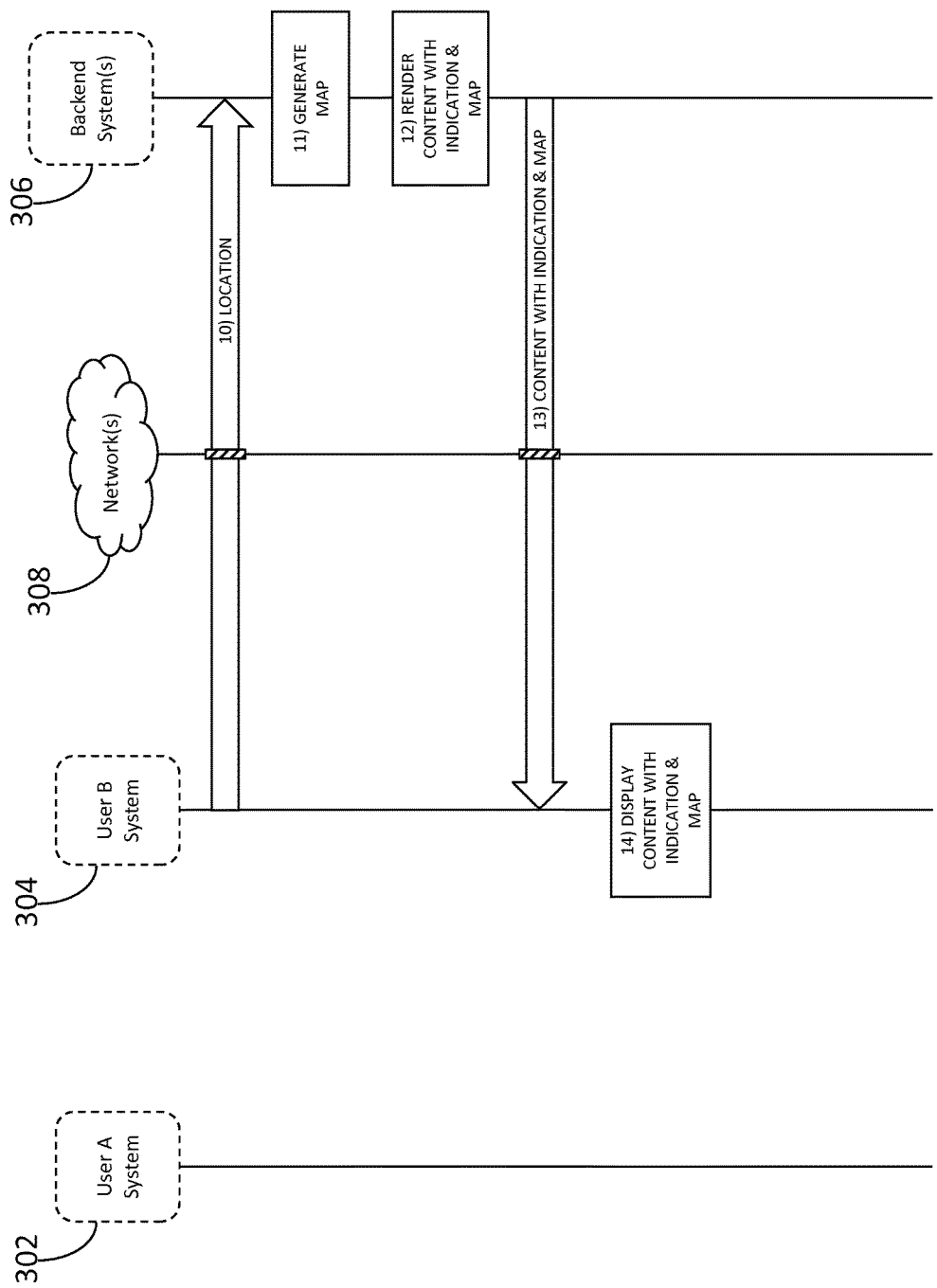

FIGS. 9A and 9B depict a further illustrative event sequence in accordance with one or more aspects of the disclosure. The events and steps illustrated in FIGS. 9A and 9B are merely illustrative, and one of ordinary skill in the art will recognize that some steps or events may be omitted, that some steps or events may be performed or occur in an order other than that illustrated, and/or that some steps or events may be performed by or occur at a device other than that illustrated. Referring to FIG. 9A, at a step 1, the user computing system 302 may render digital content. For example, the sensors 312 may include a camera, which may generate data representative of a physical scene contemporaneously observed by a user of the user computing system 302. For example, the user of the user computing system 302 may be a hunter located in a field, and may utilize the camera to generate data representative of a portion of the field that includes a target the hunter is contemporaneously observing. One or more of the computing devices 314 may utilize the data generated by the camera to render the digital content 500 (e.g., an image of the portion of the field where the target is located). At a step 2, the user computing system 302 may display the digital content 500 (e.g., the image of the portion of the field), for example, on one or more of the displays 310. At a step 3, the user of the user computing system 302 (e.g., the hunter viewing the displayed image of the portion of the field on one or more of the displays 310) may invoke an ocular-focusing-sharing feature (e.g., supported by one or more of the computing devices 314). At a step 4, the user computing system 302 (e.g., one or more of the computing devices 314) may determine a position within the digital content 500 (e.g., the displayed image of the portion of the field) that the user of the user computing system 302 is ocularly focused on, for example, a position corresponding to the element 506 (e.g., the target).

In some embodiments, the digital content 500 may not be displayed by the user computing system 302. For example, the user of user computing system 302 (e.g., the hunter) may be wearing a head-mounted display or similar device, which may be configured to allow the user to look directly at the physical scene (e.g., through a transparent lens, or the like). The head-mounted display or similar device may include a camera configured to generate the digital content 500 (e.g., data representative of the physical scene the user is observing), and the user computing system 302 (e.g., one or more of the computing devices 314) may determine a position within the digital content 500 (e.g., a position corresponding to the element 506) that corresponds to a position within the physical scene (e.g., the target) that the user is ocularly focused on. At a step 5, the user computing system 302 may determine a geographic location of the user computing system 302 (e.g., the hunter) and/or the position within the digital content 500 the user is ocularly focused on (e.g., the target). For example, the sensors 312 may include a GPS receiver, and one of the computing devices 314 may determine a geographic location of the user computing system 302 and/or the position the user is ocularly focused on within the digital content 500 (e.g., the target) based on data generated by the GPS receiver.

At a step 6, the user computing system 302 may communicate or send the digital content 500, the position corresponding to the element 506, and the geographic location(s) (e.g., of the hunter and/or the target) to the backend computing systems 306 (e.g., via the networks 308). One or more computing devices of the backend computing systems 306 (e.g., one of the focus-sharing systems 326) may receive the digital content 500, the position corresponding to the element 506, and the geographic location(s). At a step 7, the backend computing systems 306 (e.g., one of the focus-sharing systems 326) may generate a request for a geographic location of the user computing system 304 (e.g., a user computing system being utilized by a different hunter in the field), and, at a step 8, may communicate or send the request to the user computing system 304 (e.g., via the networks 308). At a step 9, the user computing system 304 may determine a geographic location of the user computing system 304 (e.g., the different hunter). For example, the sensors 318 may include a GPS receiver, and one of the computing devices 320 may determine a geographic location of the user computing system 304 based on data generated by the GPS receiver. Referring to FIG. 9B, at a step 10, the user computing system 304 may communicate or send the geographic location of the user computing system 304 (e.g.,
of the different hunter) to the backend computing systems 306 (e.g., via the networks 308). At a step 11, the backend computing systems 306 (e.g., one of the focus-sharing systems 326) may generate digital content indicating the geographic locations (e.g., a map indicating the locations of the hunter, the target, and/or the different hunter).

Figure 10:
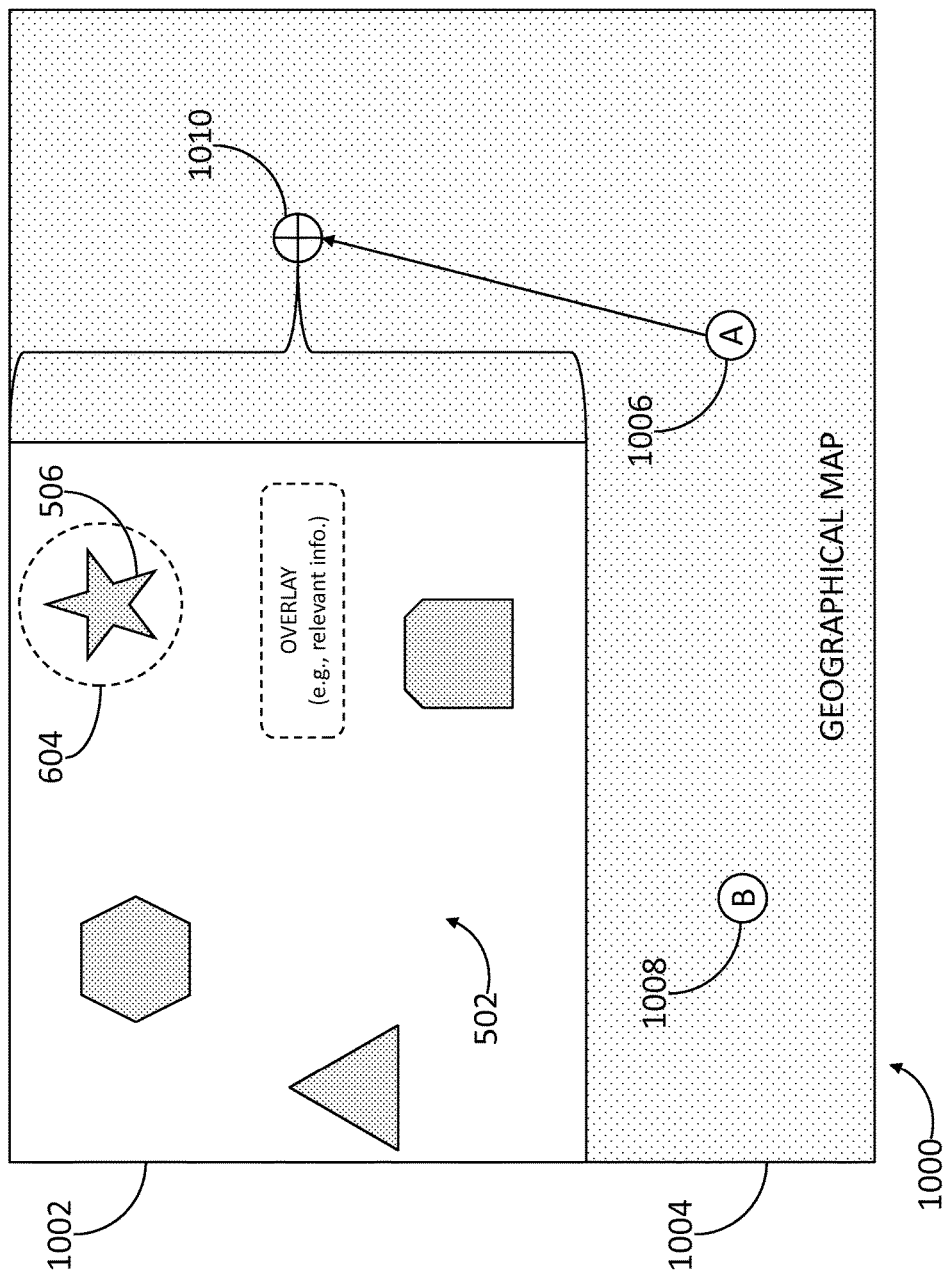
FIG. 10 depicts illustrative digital content comprising a visual indication of a position that a user is ocularly focused on and pertinent geographic locations in accordance with one or more aspects of the disclosure.

At a step 12, the backend computing systems 306 (e.g., one of the focus sharing systems 326) may render digital content comprising at least a portion of the digital content 500 (e.g., a portion of the scene 502 including the element 506 (e.g., the target)), the visual indication 604 (e.g., a visual indication of the element 506 (e.g., the target)), and the digital content indicating the geographic locations (e.g., the map indicating the locations of the hunter, the target, and/or the different hunter). For example, referring to FIG. 10, the backend computing systems 306 may render the digital content 1000. The digital content 1000 may comprise a portion 1002, which may include the portion of the scene 502 including the element 506 and the visual indication 604 (e.g., the visual indication of the element 506 (e.g., the target)). The digital content 1000 may also comprise a portion 1004, which may include the digital content indicating the geographic locations (e.g., the map indicating the locations of the hunter, the target, and/or the different hunter). The portion 1004 may include a visual indication 1006, a visual indication 1008, and a visual indication 1010, each of which may correspond to a pertinent geographic location. For example, the visual indication 1006 may correspond to the geographic location of the user computing system 302 (e.g., the hunter), the visual indication 1008 may correspond to the geographic location of the user computing system 304 (e.g., the different hunter), and the visual indication 1010 may correspond to the geographic location of the position the user (e.g., the hunter) was ocularly focused on within the digital content 500, for example, the element 506 (e.g., the target). Returning to FIG. 9B, at a step 13, the backend computing systems 306 (e.g., one of the focus-sharing systems 326) may communicate or send the digital content 1000 to the user computing system 304 (e.g., via the networks 308). At a step 14, the user computing system 304 may display the digital content 1000 on one or more of the displays 316, for example, providing one or more users of the user computing system 304 (e.g., the different hunter) with a view of what the user of the user computing system 302 was previously focused on within the digital content 500 (e.g., the target, as indicated by the visual indication 604), as well as the pertinent geographic locations (e.g., the location of the target and the hunter that ocularly focused on the target relative to his or her own location).

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed:

1. An apparatus comprising:
   one or more processors; and
   memory storing instructions that, when executed by the one or more processors, cause the apparatus to:
      cause display of an image via a first display device during a time period in which the image is displayed via a second display device;
      determine a position, in the image displayed via the first display device, that a user is ocularly focused on;
      determine a confidence value associated with the determined position; and
      send information configured to cause display, via the second display device, of a visual indication of the position, wherein a location of the visual indication is based on the determined position, in the image displayed via the first display device, that the user is ocularly focused on, and wherein the visual indication is based on the confidence value.

2. The apparatus of claim 1, wherein the image comprises digital video.

3. The apparatus of claim 1, wherein the image comprises digital content generated by a camera associated with the user.

4. The apparatus of claim 1, wherein the instructions, when executed by the one or more processors, further cause the apparatus to:
   receive, from a second apparatus, information indicating an overlay image to be overlaid on the image at the first display device; and
   cause the first display device to display the overlay image with the image.

5. The apparatus of claim 1, wherein the instructions, when executed by the one or more processors, further cause the apparatus to:
   determine a position, of the image displayed on the second display device, that a different user is ocularly focused on;
   determine a second confidence value associated with the position that the different user is ocularly focused on; and
   cause the first display device to display a visual indication of the position that the different user is ocularly focused on, wherein a size of the visual indication on the first display device is based on the second confidence value associated with the position that the different user is ocularly focused on,
   wherein, based on to a change in the second confidence value:
      the size of the visual indication changes; and
      a geometric shape of the visual indication remains the same.

6. The apparatus of claim 1, wherein the instructions, when executed by the one or more processors, further cause the apparatus to alter a location of the position in the image based on the confidence value.

7. The apparatus of claim 6, wherein the instructions, when executed by the one or more processors, cause the apparatus to alter the location of the position in the image by adjusting the image based on the confidence value.

8. The apparatus of claim 1, wherein the instructions, when executed by the one or more processors, cause the apparatus to determine the position based on data generated by a sensor physically attached to the user.

9. The apparatus of claim 8, wherein the sensor comprises a camera, wherein the image is displayed via the first display device with one or more positional indicators, wherein the data generated by the sensor comprises at least one of the one or more positional indicators, and wherein the instructions, when executed by the one or more processors, cause the apparatus to determine the position based on positional changes of the at least one of the one or more positional indicators over a period of time.

10. The apparatus of claim 1, wherein the instructions, when executed by the one or more processors, cause the apparatus to determine the position based on data generated by a stationary computing device.

11. The apparatus of claim 10, wherein the stationary computing device comprises a sensor configured to track changes in ocular position of the user over a period of time, wherein data generated by the stationary computing device comprises data indicating the changes in ocular position of the user over the period of time, and wherein the instructions, when executed by the one or more processors, cause the apparatus to determine the position based on the changes in ocular position of the user over the period of time.

12. The apparatus of claim 1, wherein the instructions, when executed by the one or more processors, cause the apparatus to determine a physical distance between the user and the first display device, and to determine the position based on the physical distance.

13. The apparatus of claim 1, wherein the image comprises a visual image generated by a camera associated with the user, and wherein the instructions, when executed by the one or more processors, further cause the apparatus to:
   determine geographic locations of the user and a different user;
   generate a visual image indicating the geographic locations; and
   send the visual image comprising a visual indication of the position and the visual image indicating the geographic locations to a computing device for display to the different user.

14. The apparatus of claim 1, further comprising the first display device.

15. An apparatus comprising:
one or more processors; and
memory storing instructions that, when executed by the one or more processors, cause the apparatus to:
cause display of digital content via a first display device;
determine a position, in the digital content displayed via the first display device, that a user of the first display device is ocularly focused on;
send, to a second apparatus associated with a second display device, information indicating the position in the digital content, for display via the second display device;
receive, from the second apparatus, information indicating an overlay image to be overlaid on or adjacent to the position in the digital content at the first display device, wherein the information to be overlaid on or adjacent to the position in the digital content at the first display device comprises information output by a user of the second display device; and
cause, via the first display device, display of the digital content with the overlay image.

16. The apparatus of claim 15, wherein the instructions, when executed by the one or more processors, further cause the apparatus to:
detect a blink sequence of the user of the first display device, and
determine the position based on the blink sequence.

17. The apparatus of claim 15, wherein the instructions, when executed by the one or more processors, further cause the apparatus to send the information to the second apparatus associated with the second display device by sending a position, within at least one frame of the digital content, that the user of the first display device is ocularly focused on.

18. The apparatus of claim 15, further comprising the first display device.

19. An apparatus comprising:
one or more processors; and
memory storing instructions that, when executed by the one or more processors, cause the apparatus to:
generate a visual image for display by a display of a computing device that is attachable to a body of a first user;
determine a position, in the visual image, that the first user is ocularly focused on; and
send information to cause a display associated with a second user to display:
the visual image, and
a visual indication of the position.

20. The apparatus of claim 19, wherein the instructions, when executed by the one or more processors, further cause the apparatus to:
determine a confidence value associated with the determined position, wherein the visual indication displayed on the display associated with the second user is based on the confidence value, and wherein, in response to a change in the confidence value:
a size of the visual indication changes; and
a geometric shape of the visual indication remains the same.

21. The apparatus of claim 20, wherein the information comprises a numeric value, indicating the confidence value, to be displayed on the display associated with the second user.

22. The apparatus of claim 19, wherein the apparatus comprises the display of the computing device.

23. A non-transitory computer-readable medium storing instructions that, when executed by one or more processors, cause an apparatus to:
cause display of an image via a first display device during a time period in which the image is displayed via a second display device;
determine a position, in the image displayed via the first display device, that a user is ocularly focused on;
determine a confidence value associated with the determined position; and
send information configured to cause display, via the second display device, of a visual indication of the position, wherein a location of the visual indication is based on the determined position, in the image displayed via the first display device, that the user is ocularly focused on, and wherein the visual indication is based on the confidence value.

24. The non-transitory computer-readable medium of claim 23, wherein the instructions, when executed by the one or more processors, further cause the apparatus to:
receive, from a second apparatus, information indicating an overlay image to be overlaid on the image at the first display device; and
cause the first display device to display the overlay image with the image.

25. The non-transitory computer-readable medium of claim 23, wherein the instructions, when executed by the one or more processors, further cause the apparatus to:
determine a position, of the image displayed on the second display device, that a different user is ocularly focused on;
determine a second confidence value associated with the position that the different user is ocularly focused on; and
cause the first display device to display a visual indication of the position that the different user is ocularly focused on, wherein a size of the visual indication on the first display device is based on the second confidence value associated with the position that the different user is ocularly focused on,
wherein, based on a change in the second confidence value:
the size of the visual indication changes; and
a geometric shape of the visual indication remains the same.

26. The non-transitory computer-readable medium of claim 23, wherein the instructions, when executed by the one or more processors, further cause the apparatus to:
cause display of an overlay on the image via the first display device, wherein the overlay comprises one or more positional indicators located at predetermined locations of the image; and
determine the position relative to the one or more positional indicators.

27. The non-transitory computer-readable medium of claim 26, wherein the one or more positional indicators are located at positions corresponding to one or more corners of the image.

* * * * *

UNITED STATES PATENT AND TRADEMARK OFFICE
CERTIFICATE OF CORRECTION

PATENT NO. : 10,394,336 B2  
APPLICATION NO. : 15/928235  
DATED : August 27, 2019  
INVENTOR(S) : Monnerat et al.

It is certified that error appears in the above-identified patent and that said Letters Patent is hereby corrected as shown below:

In the Specification

Column 6, Detailed Description, Line 34:
Please delete "like)." and insert --like)).--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*